United States Patent [19]

Desgagnes

[11] Patent Number: 4,542,546
[45] Date of Patent: Sep. 24, 1985

[54] HEAT RECUPERATOR ADAPTED TO A SHOWER-CABIN

[76] Inventor: Arthur Desgagnes, 2740, DesCôteaux, Sherbrooke, (Quebec), Canada, J1K 1N4

[21] Appl. No.: 622,998

[22] Filed: Jun. 21, 1984

[30] Foreign Application Priority Data

Jun. 30, 1983 [CA] Canada .................................. 431661

[51] Int. Cl.⁴ .............................................. A47K 3/22
[52] U.S. Cl. ......................................... 4/598; 4/596; 4/605; 4/612; 4/615; 165/66
[58] Field of Search .................... 4/598, 545, 597, 613, 4/612, 191, 192, 584, 602, 605–619, 615; 138/38; 165/66, 163

[56] References Cited

U.S. PATENT DOCUMENTS

| 3,263,242 | 8/1966 | Will | 4/598 |
| 3,361,194 | 1/1968 | Cowlin | 165/66 |
| 4,291,423 | 9/1981 | Wilson | 4/598 |
| 4,300,247 | 11/1981 | Berg | 165/66 X |
| 4,372,372 | 2/1983 | Hunter | 4/598 X |
| 4,398,308 | 8/1983 | Berg | 4/598 |

FOREIGN PATENT DOCUMENTS

| 49164 | 8/1934 | Denmark | 4/598 |
| 2855558 | 7/1980 | Fed. Rep. of Germany | 4/598 |
| 3202910 | 8/1983 | Fed. Rep. of Germany | 4/598 |

OTHER PUBLICATIONS

"Heating & Air Conditioning", article of A. A. Field, Solar Energy: Part II, the Continent, Mar. 1976.

Primary Examiner—Henry K. Artis
Attorney, Agent, or Firm—Robic, Robic & Associates

[57] ABSTRACT

An improved shower-cabin comprising a base provided with a drain for evacuating waste water, and a heat recuperator incorporated into this base. The recuperator comprises a waste water tank connected to the cabin drain and a coil mounted in this tank. The heat of the waste water passing through the tank may be recovered for heating or pre-heating an incoming cold water flowing through the coil.

13 Claims, 1 Drawing Figure

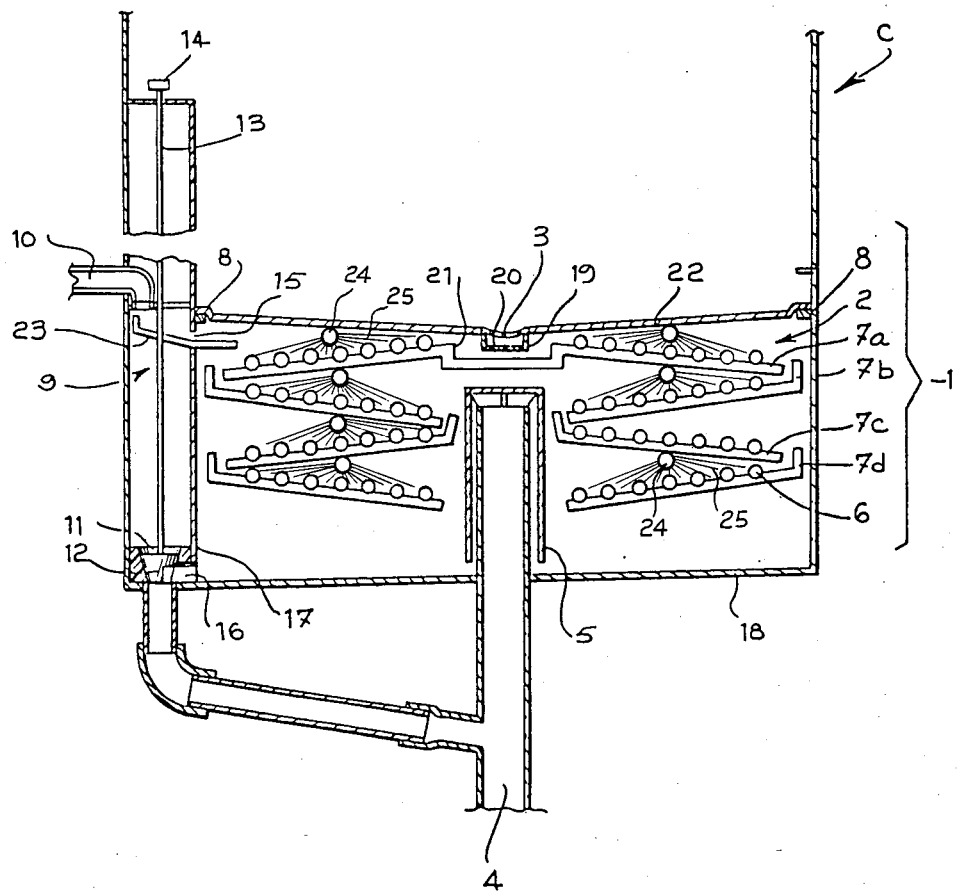

HEAT RECUPERATOR ADAPTED TO A SHOWER-CABIN

BACKGROUND OF THE INVENTION

1. Field of the Invention

The present invention relates to an improved shower-cabin wherein part of the heat contained in the waste water of a house may be recovered for heating or pre-heating an incoming of cold water from a city aqueduct or a well.

2. Brief Description of the Prior Art

An Article of A. A. Field published in "Solar Energy: Part II, the Continent", Heating & Air Conditioning, March 1976, discloses a sophisticated and onerous device for recovering part of the heat contained in the waste water of a house. This device which is intended to be positioned in a basement, has up to now remained within the field of experimental searches for new technologies because of the substantial room requested for its installation and the installation cost. As a result waste waters are usually directly discharged in a sewer without any step for recovering their heat content.

SUMMARY OF THE INVENTION

An object of the present invention is to provide an improved shower-cabin which is designed to allow recovery of at least part of the heat contained in waste water of a house. Another object of the invention is to provide an improved shower-cabin of the above type, which is simple, efficient, cheap and easy to install in any existing house or building, thereby making it possible for the house keeper to recover his investment within a very short period of time only, with his energy savings.

The improved shower-cabin according to the invention is of the type comprising a bottom surface and a base provided with a drain for evacuating waste water. This shower-cabin is improved in that a heat recuperator is incorporated into its base. This recuperator comprises a coil positioned inside a waste water tank, said tank having a top surface, an inlet connected to the cabin drain and an outlet, the top surface of said tank forming the bottom surface of said shower-cabin, whereby part of the heat contained in the waste water may be recovered and used to heat or pre-heat an incoming clean water flowing through said coil.

The installation of a heat recuperator into the base of a shower-cabin as called for in accordance with the present invention is particularly advantageous from a financial point of view because the hot water used in a shower represents an important part of the cold water that is heated, often at high costs, to meet with the various daily requirements for hot water in a house. Furthermore, as the hot water coming out from the shower nozzle is quickly fed to the heat recuperator, it becomes possible to simultaneously transfer a substantial amount of calories contained in the waste water which is still warm to the cold water which is fed to the water-heater or water taps.

Advantageously, the outlet of the coil of the heat recuperator can be connected to the cold water tap of the shower to increase the heat recovery efficiency by reduction of the amount of hot water coming from the water-heater. In this case, the water supplied to the shower nozzle is a mixture of hot water and of pre-heated cold water. Such a connection is also advantageous in that it may contribute to stabilization of the temperature of the water supplied to the shower nozzle by reduction of its sudden change in temperature, caused by sudden change in pressure in the hot water or cold water pipes of a building. It should be noted that the smaller is the amount of hot water coming from the water-heater, the higher is the temperature stabilization of the water coming out from the shower nozzle.

According to a preferred embodiment of the invention, the heat recuperator is mounted to allow recovery of part of the heat contained in waste water of a house with or without stocking of the waste water. In this particular embodiment, the coil is supported on at least one inclined plate positioned inside the tank, and the tank comprises:

an overflow positioned at a predetermined level beyond which the waste water collected in the tank is evacuated;

a small lateral chamber having an inlet for receiving waste water different from the one coming from the shower-cabin and an outlet for this waste water, this small chamber being in communication with the tank via two lateral openings that respectively connect the upper and lower zones of the chamber and tank; and obturation means for closing the waste water outlet of the small chamber.

The obturation means may consist of a plug that is hand operated with a vertical rod. Advantageously, this obturation may be designed to simultaneously close the waste water outlet of the small chamber and the lateral opening that connects the lower zones of the chamber and the tank. The obturation may however be designed to close the waste water outlet of the small chamber and simultaneously open the lateral opening between the lower zones of the chamber and tank to allow waste water in the tank to flow toward a sewer via the opening.

The waste water inlet of the small chamber may be provided with a deflector intended to force waste water different from the one coming from the shower-cabin, to flow in the tank via the lateral opening that connects the upper zones of the chamber and the tank.

The inclined plate used for supporting the coil may have an upper surface provided with a spiral-shaped groove for receiving and holding a corresponding portion of the coil. Advantageously, the coil rests on a set of slightly inclined plates that are superimposed in a cascade-like arrangement, each plate supporting a corresponding portion of the coil.

The plate immediately under the inlet of the tank may have a reversed saucer shape, the other plates alternatively having non-reversed and reversed saucer shapes. In this case, each of the plates has a central portion provided with an opening to allow waste water to flow in cascade toward the next plate down to the bottom of the tank, and give room to the overflow.

Each of the plates may be held in place inside the tank by means of fixation members that connect, by way of exemple, the outer edges of the plates with the inner walls of the tank. Use can also be made of supporting members to stack up the plates one above the other.

The plates and the tank may be of plastic material or of corrosion resistant metal or of fiber glass. The coil has advantageously its inlet located near the bottom of the tank and its outlet located near the top of the tank. It may be made of a material having a high coefficient of heat conductivity, such as copper.

The inlet of the tank may advantageously extend downwardly into a small pan located in the central portion of the plate immediately under the inlet of the tank, to define a gas trap stopping escape of unpleasant odors from the tank. The inlet of the tank may advantageously be provided with a grid intended to avoid any clogging of the heat recuperator by solid soap particles or aggregates, hair, etc . . .

The small chamber and the tank are advantageously integrated to each other so as to have at least one lateral wall in common, preferably a single lateral wall, in which the lateral openings are provided for.

The top of the tank (i.e. the bottom of the shower-cabin) or at least one portion ot it, is preferably removable to allow easy cleaning and maintenance of the heat recuperator and/or of its structural components Cleaning of the heat recuperator may be carried out with a cleaning coil positioned inside the tank. The cleaning coil is closed at one end and is intended to be connected by its other end to a clean water supply. A plurality of lateral openings are provided therein to direct a plurality of streams of clean water into which may be added a cleaning agent, toward the surfaces to be cleaned, preferably against the coil through which the incoming cold water is flowing.

Another object of the invention is to provide a method for recovering part of the heat contained in a warm waste water collected at the bottom of a shower-cabin as described hereinabove, and for using this recovered heat for heating or pre-heating an incoming cold water flowing through a coil.

According to a preferred embodiment of the invention, this method comprises the steps of:

closing the outlet of the small chamber while keeping open the lateral opening that connects the lower zones of the chamber and of the tank;

either feeding the tank, via its inlet, with the warm waste water coming from the shower-cabin, or feeding the tank, via the waste water inlet of the small chamber, with a warm waste water different from the one coming from the shower-cabin;

allowing the waste water to flow on the plates of the heat recuperator and to contact the coil for heating or pre-heating an incoming clean water flowing therethrough; and evacuating the cool waste toward a sewer via this lateral opening, the heated or pre-heated clean water being either directed toward a cold water tap or toward a water-heater. Of course, when the amount of warm waste water entering the tank is greater than the amount of cool waste water evacuated via the lateral opening, the warm waste water fills the tank up to the level determined by the overflow until, the excess of waste water entering the tank is evacuated toward a sewer via the overflow.

According to another preferred embodiment of the invention, this method comprises the steps of:

closing the outlet of the small chamber and the lateral opening that connects the lower zones of the chamber and tank;

either feeding the tank, via its inlet, with the warm waste water coming from the shower-cabin, or feeding the tank, via the waste water inlet of the small chamber, with a warm waste water different from the one coming from the shower-cabin;

allowing the waste water to flow on the plate of the heat recuperator and to contact the coil for heating or pre-heating an incoming clean water flowing therethrough;

filling the tank with said warm waste water up to the level determined by the overflow; and evacuating the cool waste water toward a sewer via the overflow, this heated or pre-heated clean water being either directed toward a cold water tap or toward a water-heater.

Depending on the amount of warm waste water intended to be collected in the tank and the simultaneity of the income of warm waste water in the tank with respect of the flow of cold water in the coil, the above-mentioned methods may be carried out according to one or more of the following preferred ways:

(1) When the warm waste water coming from the shower-cabin or a warm waste water different from the one coming from the shower-cabin is flowing at the same time as the cold water in their respective tank and coil, it is possible, with the method forming the subject of the first preferred embodiment of the invention, to simultaneously recover the heat of said waste water to heat or pre-heat an incoming cold water flowing in the coil, and evacuate the cool waste water toward a sewer.

The expression "warm waste water different from the one coming from the shower cabin" designates, by way of example, a waste water coming from another shower-cabin preferably located at a higher level than the one provided with a heat-recuperator according to the invention.

When the warm waste water comes from the shower-cabin, the heated or pre-heated clean water is preferably used to supply the cold water tap of this shower-cabin.

(2) When a warm waste water different from the one coming from the shower-cabin is not flowing at the same time as the cold water in the coil, it is possible, with the method forming the subject matter of the second preferred embodiment, to stock the warm waste water in the tank and to subsequently recover its heat for heating or pre-heating an incoming cold water flowing in the coil. Of course, when the amount of waste water entering the tank is greater than the volume of the tank, the excess is evacuated toward the sewer via the overflow.

By way of example, the warm waste water of a washing machine may be fed to the tank of the heat recuperator and kept there for a given period of time, the eventual excess of warm waste water being evacuated toward a sewer via the overflow. When the washing machine is refilled, a few minutes later, with clean water, part of the heat contained in the waste water kept in the tank may be recovered to heat or pre-heat the incoming cold clean water that is feeding the water-heater or the cold water tap connected to the washing machine.

(3) When the warm waste water coming from the shower-cabin or a warm waste water different from the one coming from the shower-cabin is flowing at the same time as the cold water it is possible, with the method forming the subject matter of the second preferred embodiment of the invention, to simultaneously recover heat from this waste water for heating or pre-heating an incoming cold water flowing in the coil, to fill the tank with the waste water up to the level determined by the overflow, and to evacuate the cool waste water toward a sewer. Furthermore, it is still possible to recover more heat from the warm waste water contained in the tank by carrying out the steps recited in the above paragraph (2), Of course, when the heat recuperator has to be cleaned or repaired, the small chamber and the tank may be completely emptied by opening the outlet of the small chamber and the lateral opening that connects the lower zones of the chamber and the tank, and by letting the content of the tank flow out by gravity in the sewer via the lateral opening and the outlet of the small chamber.

BRIEF DESCRIPTION OF THE DRAWINGS

The invention and some of its advantages will be better understood with reference to the following non-restrictive description of a preferred embodiment thereof, taken in connection with the accompanying drawing wherein the single figure represents a cross-sectional, side elevational view of the base of a shower-cabin according to the invention.

DESCRIPTION OF A PREFERRED EMBODIMENT

The heat recuperator 1, as shown in the drawing, is integrated into the base of a shower-cabin "C" and comprises a small chamber 9 and a tank 2. The tank 2 is provided with an inlet 3 for the waste water coming from the shower-cabin, and with an outlet equiped with an overflow 5 for the waste water contained in the tank. The tank 2 is also provided with a coil 6 in which a cold clean water may flow. The coil rests on a set of plates 7a, 7b, 7c and 7d. The tank is further provided with a removable top 22 resting on supports 8.

The small chamber 9 has an inlet 10 for a waste water different from the one coming from the shower-cabin "C", and an outlet 11 for the waste water contained in the small chamber and/or in the tank 2. The outlet 11 may be closed by lowering a plug 12 with a rod 13 having its upper end connected to a knob 14.

The small chamber 9 also has a deflector 23 positioned under the inlet 10 to force the waste water to flow toward the plates of the heat-recuperator 1 via a lateral opening 15 located in the wall 17. By mere rotation of the plug 12 around its vertical axis, it is possible either to close the outlet 11 and the lateral opening 16 located in the wall 17 (simultaneous or non-simultaneous heat recovery with stocking of waste water) or to close the outlet 11 and keep open the lateral opening 16 to evacuate waste water collected in the tank 2 toward a sewer (simultaneous heat recovery without stocking of waste water).

The heat recuperator also has a bottom 18 which is slightly inclined toward a lateral opening 16 to empty the small chamber 9 and the tank 2, whenever needed, or to direct the waste water flow toward a sewer during a simultaneous heat recovery without stocking of the waste water in the tank.

The inlet 3 is extended by a small pipe 19 provided with a grid 20, down to a pan 21 forming part of the plate 7a to define a gas trap. The plates 7a and 7c have a reversed saucer shape whereas the plates 7b and 7d have a non-reversed saucer shape. All these plates are superimposed one over the other to define a cascade for the waste water. The central portion of plates 7b and 7d is provided with an opening to give room to the overflow 5, and, as far as plates 7b and 7d are concerned, to allow waste water to flow in cascade toward the next plate 7c or the bottom of the tank 2, respectively.

In use, either the outlet 11 is closed with the plug 12 (i.e. to allow simultaneous recovery of part of the heat contained in waste water without stocking this waste water in the tank 2), or the outlet 11 and the lateral opening 16 are closed with the plug 12 (i.e. to allow simultaneous or non-simultaneous recovery of part of the heat contained in the waste water with stocking of this waste water in the tank 2). As soon as a flow of clean water is established in the piping of the building, at least part of this flow of clean water coming from a water-heater, a cold clean water coming from a city aqueduct, will pass through the coil 6 in which it will be heated before being fed to a water tap or the water-heater and thereafter, entering the heat recuperator 1 via the inlets 3 or 10.

When the waste water comes from the shower-cabin, it enters the heat recuperator via the inlet 3, passes through the gas trap and flows on the plates 7a, 7b, 7c and 7d to contact the coil 6. During this contact, the warm waste water transfers part of its heat to the cold water flowing in said coil, and this while said waste water is evacuated toward a sewer. This waste water may be evacuated toward a sewer after having successively flowed on each plates 7a, 7b, 7c and 7d, via the lateral opening 16 and the outlet 11 of after having successively flowed on each plates 7a, 7b, 7c and 7d and fills up the tank 2 up to the level of the overflow 5 that draws out the cool waste water located near the bottom of the tank 2. The clean water flowing in the coil 6 is fed to a waterheater or a cold water tap.

When the outlet 11 and the lateral opening 16 are closed, the warm waste water may be introduced in the heat recuperator, in a manner similar to the one hereinbefore recited, except that the warm waste water or part of it is kept in the tank 2 so as to subsequently recover its heat. Of course, after a certain period of time, the outlet 11 and the lateral opening 16 have to be opened to completely empty the small chamber 9 and the tank 2 for an obvious sanitary purpose.

The top 22 of the heat recuperator may be laid freely on the support 8 so as to be manually removed and to allow easy cleaning and/or maintenance of the heat recuperator.

A coil 24 having a plurality of lateral openings, a closed end and an open end connected to a clean water supply, is positioned inside the tank 2. When the clean water is fed through the coil 24, the plurality of lateral openings are directing streams 25 of clean water to the coil 6 and plates 7a to 7d for the purpose of cleaning them.

What is claimed is:

1. In a shower-cabin comprising a bottom surface and a base provided with a drain for evacuating waste water, a heat recuperator incorporated into said base, said heat recuperator comprising a waste water tank provided with a coil mounted on a set of slightly inclined plates that are superimposed in a cascadelike arrangement, said tank having a top surface, an inlet connected to the cabin drain, an outlet and an overflow positioned at a predetermined level beyond which the water collected in the tank is evacuated, the top surface of said tank forming the bottom surface of said shower-cabin, whereby part of the heat contained in the waste water may be recovered and used to heat or pre-heat an incoming clean water flowing through said coil, the improvement wherein said waste water tank further comprises:

a small lateral chamber having an inlet for receiving waste water different from the one coming from the shower and an outlet for said waste water, said small chamber being in communication with the tank via two lateral openings that respectively connect the upper and lower zones of said chambers and said tank to each other; and obturation means in the waste water outlet of the samll chamber.

2. The improved shower-cabin of claim 1, wherein the tank further comprises:

a small lateral chamber having an inlet for receiving waste water different from the one coming from the shower-cabin and an outlet for said waste water, said small chamber being in communication with the tank via two lateral openings that respectively connect the upper and lower zones of said chamber and said tank; and obturation means for simultaneously closing or opening the waste water outlet of the small chamber and the lateral opening that connects the lower zones of said chamber and of said tank.

3. The improved shower-cabin of claim 2, wherein said obturation means consists of a plug hand-operated with a vertical rod.

4. The improved shower-cabin of claim 2, wherein the small chamber and the tank are integrated to each other so as to have at least one lateral wall in common.

5. The improved shower-cabin of claim 4, wherein said lateral openings are provided for in said at least one common wall.

6. In a shower-cabin comprising a bottom surface and a base provided with a drain for evacuating waste water, a heat recuperator incorporated into said base, said heat recuperator comprising a waste water tank provided with a coil mounted on a set of slightly inclined plates that are superimposed in a cascadelike arrangement, each plate having an upper surface provided with a spiral-shaped groove for receiving and holding a corresponding portion of the coil, said tank having a top surface, an inlet connected to the cabin drain, an outlet and an overflow positioned at a predetermined level beyond which the water collected in the tank is evacuated, the top surface of said tank forming the bottom surface of said shower-cabin, whereby part of the heat contained in the waste water may be recovered and used to heat or pre-heat an incoming clean water flowing through said coil, the improvement consisting in a plate, immediately positioned under the inlet of the tank, said plate having a reversed saucer shape, and other plates alternatively having non-reversed and reversed saucer shapes, each of said other plates having a central portion provided with an opening to allow waste water to flow in cascade toward the next plate down to the bottom of the tank and to give room to the overflow.

7. The improved shower-cabin of claim 6, wherein the inlet of the tank extends downwardly into a small pan located in the central portion of the plate immediately under the inlet of the tank, to define a gas trap stopping escape of unpleasant odors from the tank.

8. The improved shower-cabin of claim 7, wherein the inlet of the tank is provided with a grid.

9. The improved shower-cabin of claim 6, further comprising means for cleaning the heat recuperator, said means consisting of a coil positioned inside the tank and having one end closed while its opposite end is connected to a clean water supply, said coil having a plurality of lateral openings directing a plurality of streams of clean water against the surfaces to be cleaned.

10. A method for recovering heat contained in a warm waste water collected at the bottom of an improved shower-cabin as claimed in claim 2, and for using this recovered heat for preheating an incoming clean water flowing in a coil, said method comprising the steps of:

closing the outlet of the small chamber while keeping open the lateral opening that connects the lower zones of the chamber and the tank;

feeding the tank, via its inlet, with the warm waste water coming from the bottom of the shower-cabin;

allowing said waste water to flow on the plate of the heat recuperator and to contact the coil for pre-heating the incoming clean water flowing therethrough;

evacuating the cool waste water toward a sewer via said lateral opening, the pre-heated clean water being either directed toward a cold water tap or toward a water-heater with the proviso that when the amount of warm waste water entering the tank is greater the amount of cooled waste water evacuated from said tank, said warm waste water is allowed to fill the tank up to the level determined by the overflow, the excess of warm waste water entering the tank being then evacuated toward a sewer via said overflow.

11. A method for recovering heat contained in a warm waste water collected at the bottom of an improved shower-cabin as claimed in claim 5 for using this recovered heat for pre-heating an incoming clean water flowing in a coil, said method comprising the steps of:

closing the outlet of the small chamber and of the lateral opening that connects the lower zones of said chamber and of the tank;

feeding the tank, via its inlet, with the warm waste water coming from the bottom of the shower-cabin;

allowing said waste water to flow on the plate of the heat recuperator and to contact the coil for pre-heating the incoming clean water;

filling the tank with said warm waste water up to the level determined by the overflow, and evacuating the cool waste water toward a sewer via said overflow, said pre-heated clean water being either directed toward a cold-water tap or a water-heater.

12. The method of claim 11, comprising the additional step of completely emptying the tank of waste water, by opening the outlet of the small chamber and the lateral opening that connects the lower zones of the small chamber and of the tank, and letting flow the content of the tank by gravity in the sewer via said lateral opening and said outlet of the small chamber.

13. The method of claim 12, wherein, when filling of the tank with warm waste water is stopped, the warm waste water contained in the tank is kept there for a certain period of time before it is evacuated toward the sewer, whereby more heat is extracted from said warm waste water for pre-heating an incoming clean water flowing in the coil.

* * * * *